US010711595B2

(12) United States Patent
Wheelock et al.

(10) Patent No.: US 10,711,595 B2
(45) Date of Patent: Jul. 14, 2020

(54) HYDROCARBON WELLS AND METHODS FOR IDENTIFYING PRODUCTION FROM A REGION OF A SUBTERRANEAN FORMATION

(71) Applicant: ExxonMobil Upstream Research Company, Spring, TX (US)

(72) Inventors: Brent D. Wheelock, Morristown, NJ (US); Mehmet Deniz Ertas, Bethlehem, PA (US); Joseph W. Witt, The Woodlands, TX (US); David A. Howell, Houston, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 0 days.

(21) Appl. No.: 16/421,994

(22) Filed: May 24, 2019

(65) Prior Publication Data

US 2020/0018154 A1 Jan. 16, 2020

Related U.S. Application Data

(60) Provisional application No. 62/697,110, filed on Jul. 12, 2018.

(51) Int. Cl.
*E21B 47/10* (2012.01)
*E21B 43/14* (2006.01)
(Continued)

(52) U.S. Cl.
CPC .......... *E21B 47/1015* (2013.01); *E21B 43/14* (2013.01); *E21B 49/08* (2013.01); *G01V 3/088* (2013.01)

(58) Field of Classification Search
None
See application file for complete search history.

(56) References Cited

U.S. PATENT DOCUMENTS

| 8,596,354 B2 | 12/2013 | Hartshorne | |
|---|---|---|---|
| 2006/0076956 A1* | 4/2006 | Sjolie | E21B 43/16 324/324 |

(Continued)

OTHER PUBLICATIONS

Lawson and Hanson, "Solving Least Squares Problems", Prentice-Hall, 1974.

*Primary Examiner* — Andrew Sue-Ako
(74) *Attorney, Agent, or Firm* — ExxonMobil Upstream Research Company—Law Department

(57) ABSTRACT

Hydrocarbon wells and methods for identifying production from a region of a subterranean formation. The hydrocarbon wells include a wellbore extending within the region of the subterranean formation and a production tubular that defines a production conduit and extends at least partially within the wellbore. The hydrocarbon wells also include an electromagnetic transmitter, an electromagnetic receiver, and a controller. The electromagnetic transmitter is configured to provide an input electromagnetic signal to a region of the production conduit to electromagnetically excite a produced tracer material that forms a portion of a produced stream that flows within the production tubular. The electromagnetic receiver is configured to receive an electromagnetic output signal from the region of the production conduit. The controller is programmed to identify the region of the subterranean formation based, at least in part, on the output electromagnetic signal. The methods include methods of operating the hydrocarbon wells.

23 Claims, 11 Drawing Sheets

(51) Int. Cl.
*E21B 49/08* (2006.01)
*G01V 3/08* (2006.01)

(56) References Cited

U.S. PATENT DOCUMENTS

| | | | |
|---|---|---|---|
| 2011/0303408 A1* | 12/2011 | Hartshorne | E21B 21/068 |
| | | | 166/250.12 |
| 2013/0105224 A1* | 5/2013 | Donderici | G01V 3/30 |
| | | | 175/45 |
| 2015/0130468 A1 | 5/2015 | Christian et al. | |
| 2015/0176396 A1 | 6/2015 | Nyhavn | |
| 2016/0047232 A1 | 2/2016 | Palomarez | |
| 2016/0076926 A1* | 3/2016 | McCann | G01F 1/58 |
| | | | 73/152.29 |
| 2016/0281476 A1 | 9/2016 | Sladic et al. | |
| 2017/0097443 A1* | 4/2017 | Bernstein | E21B 43/16 |
| 2018/0149020 A1 | 5/2018 | Wheelock et al. | |

* cited by examiner

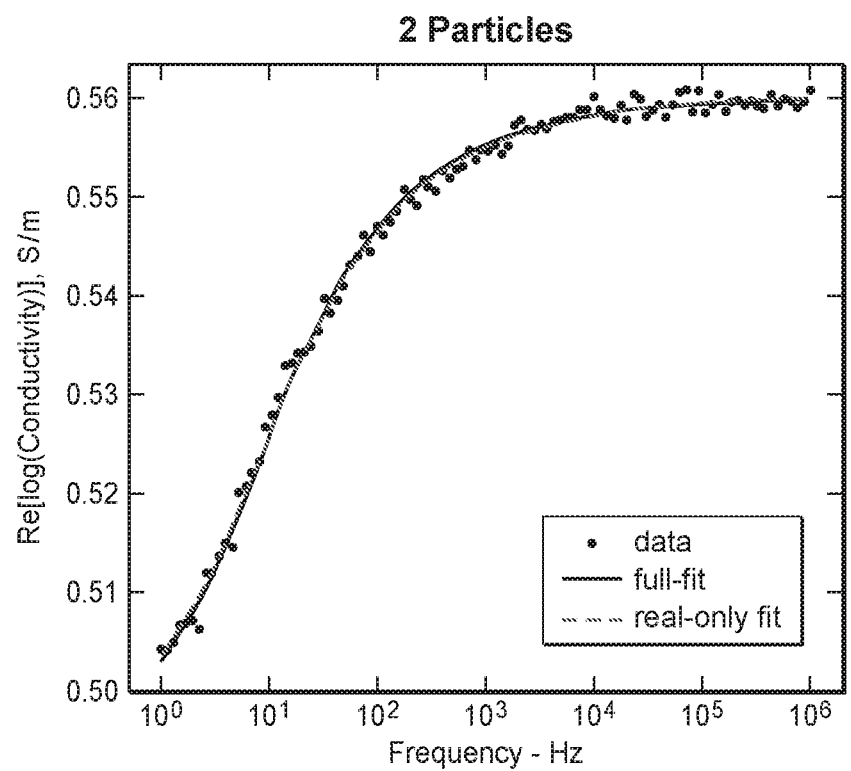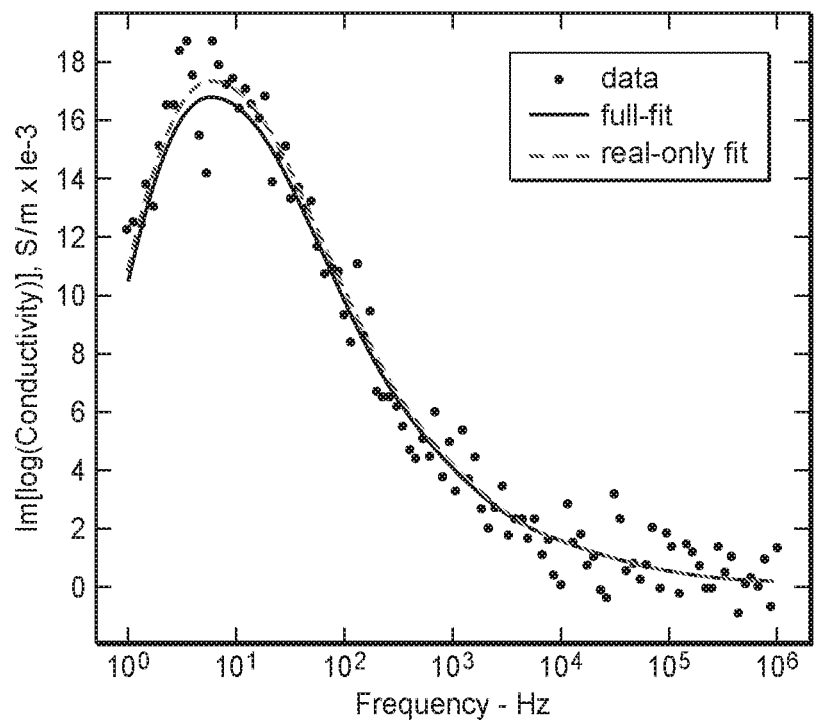
FIG. 7

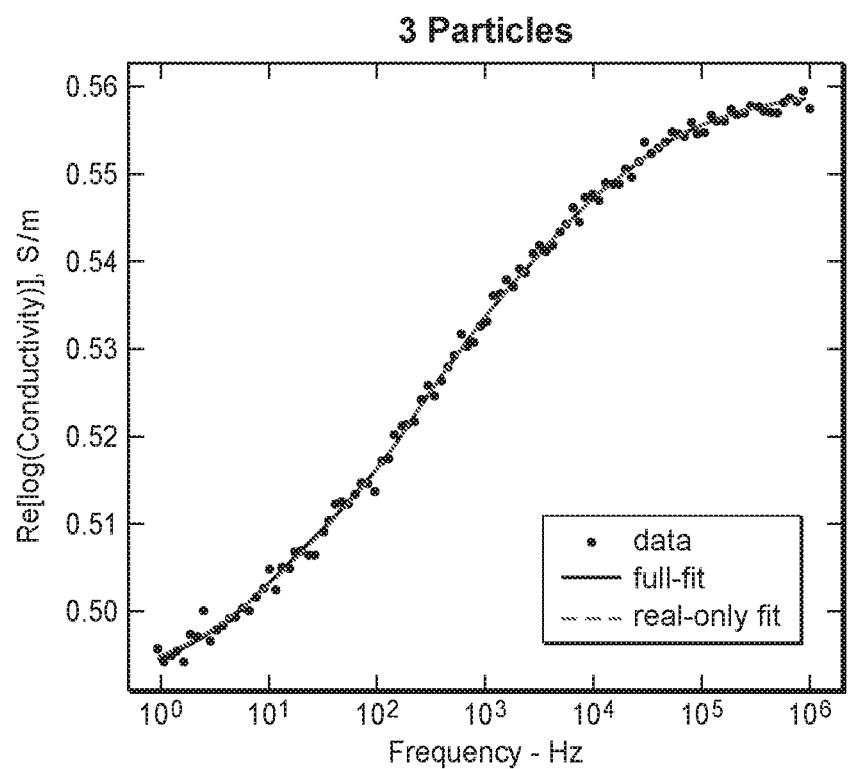
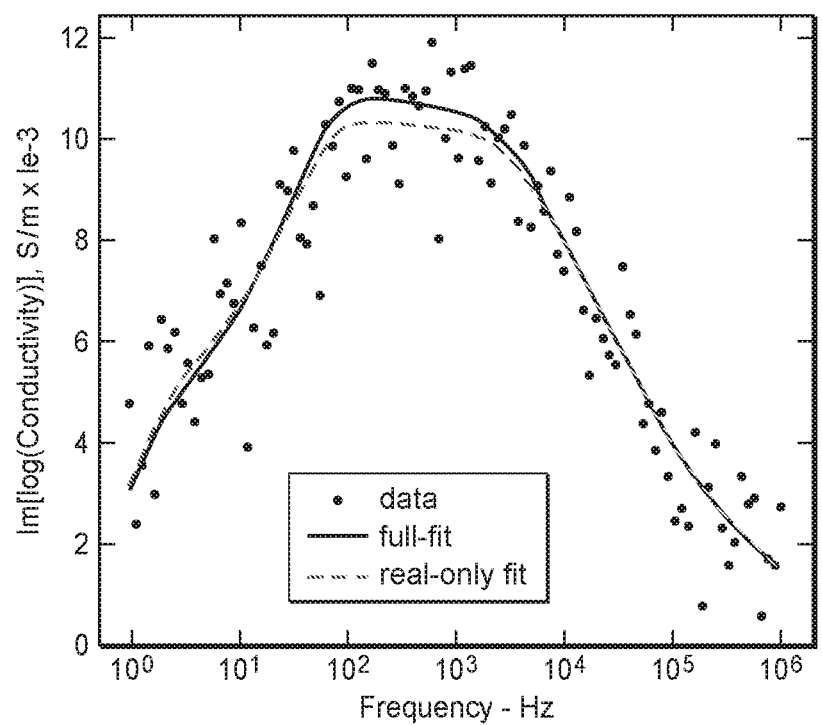
FIG. 8

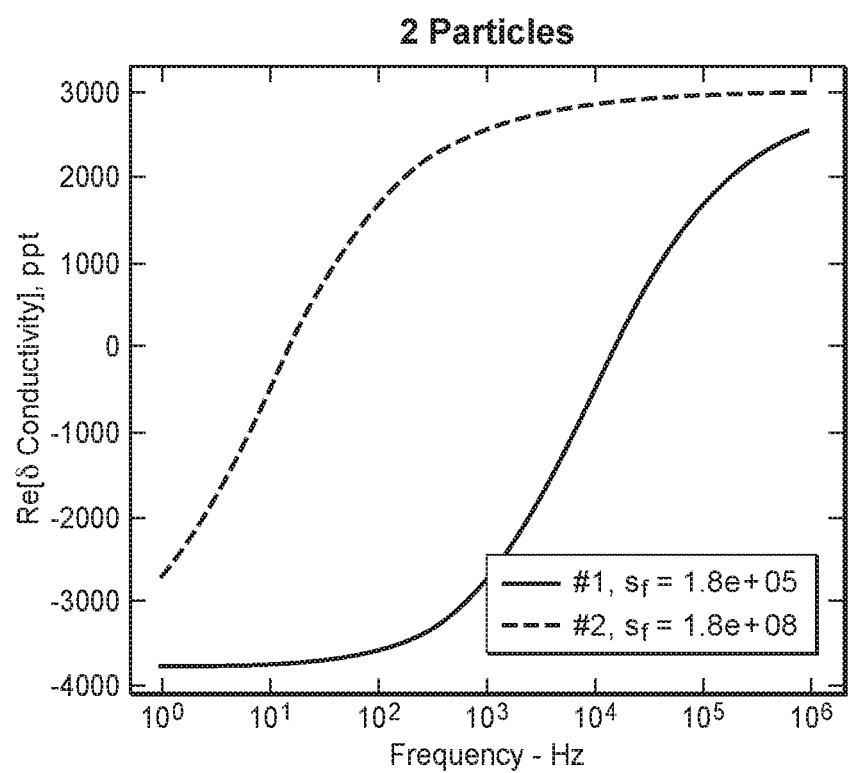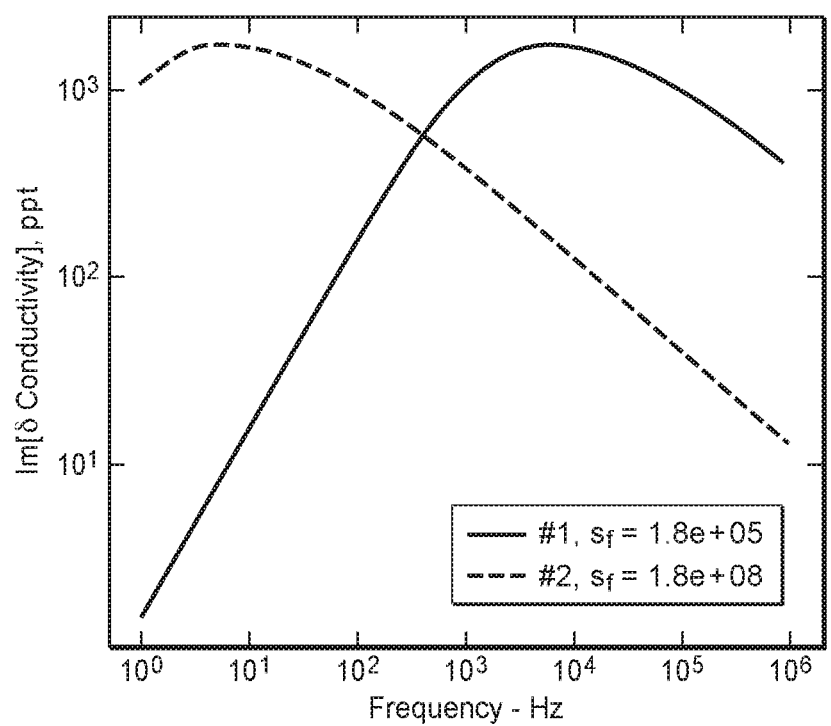
FIG. 10

HYDROCARBON WELLS AND METHODS FOR IDENTIFYING PRODUCTION FROM A REGION OF A SUBTERRANEAN FORMATION

CROSS-REFERENCE TO RELATED APPLICATION

This application claims the benefit of U.S. Provisional Patent Application 62/697,110 filed Jul. 12, 2018, the entirety of which is incorporated by reference herein.

FIELD OF THE DISCLOSURE

The present disclosure relates generally to hydrocarbon wells and methods for identifying production from a region of a subterranean formation, and more particularly to hydrocarbon wells and methods that detect a produced tracer material to identify the production.

BACKGROUND OF THE DISCLOSURE

Wells generally include a wellbore that extends within a subterranean formation, with the subterranean formation including a material that is to be produced by the well. As an example, a wellbore of a hydrocarbon well may extend within a subterranean formation that includes a hydrocarbon, such as a liquid hydrocarbon and/or a gaseous hydrocarbon, and the hydrocarbon well may be configured to produce the hydrocarbon from the subterranean formation.

The hydrocarbon wells may extend through a plurality of spaced-apart regions of the subterranean formation and/or may include a corresponding completion that permits fluid communication between a production conduit of the hydrocarbon well and the plurality of spaced-apart regions of the subterranean formation. Ideally, production of the hydrocarbon from each of the plurality of spaced-apart regions is constant and/or comparable across the plurality of spaced-apart regions. In reality, certain regions of the subterranean formation may produce significantly more hydrocarbon when compared to other regions of the subterranean formation, and it may be desirable to identify and/or quantify hydrocarbon fluid production from each of the plurality of spaced-apart regions of the subterranean formation. Thus, there exists a need for improved hydrocarbon wells and methods for identifying production from a region of a subterranean formation.

SUMMARY OF THE DISCLOSURE

Hydrocarbon wells and methods for identifying production from a region of a subterranean formation are disclosed herein. The hydrocarbon wells include a wellbore extending within the region of the subterranean formation and a production tubular that defines a production conduit and extends at least partially within the wellbore. The hydrocarbon wells also include an electromagnetic transmitter, an electromagnetic receiver, and a controller. The electromagnetic transmitter is configured to provide an input electromagnetic signal to a region of the production conduit to electromagnetically excite a produced tracer material that forms a portion of a produced stream that flows within the production tubular. The electromagnetic receiver is configured to receive an electromagnetic output signal from the region of the production conduit. The electromagnetic output signal is generated by the produced tracer material responsive to electromagnetic excitation of the produced tracer material by the input electromagnetic signal. The controller is programmed to identify the region of the subterranean formation based, at least in part, on the output electromagnetic signal.

The methods include methods of monitoring production of fluids from a subterranean formation. These methods include producing a produced stream via a hydrocarbon well that extends within a region of the subterranean formation. The region of the subterranean formation includes formation fluid and an added tracer material, and the produced stream includes a produced fluid and a portion of the added tracer material that is produced from the subterranean formation as a produced tracer material. The produced tracer material includes a particulate tracer that defines a tracer electrical capacitance that differs from a fluid electrical capacitance of the produced fluid.

The methods also include electromagnetically exciting the produced tracer material with an input electromagnetic signal that varies through an input frequency range and, responsive to the electromagnetically exciting, generating an output electromagnetic signal with the produced tracer material. The methods further include receiving the output electromagnetic signal from the produced tracer material and identifying the region of the subterranean formation based, at least in part, on the output electromagnetic signal.

BRIEF DESCRIPTION OF THE DRAWINGS

FIG. 7 is a collection of plots illustrating inversion results for the produced tracer materials that include 2 electromagnetically distinct added tracer materials from the example analysis of FIG. 6.

FIG. 8 is a collection of plots illustrating inversion results for the produced tracer materials that include 3 electromagnetically distinct added tracer materials from the example analysis of FIG. 6.

FIG. 10 is a collection of plots illustrating real and imaginary portions of the determined volume fractions for the produced tracer materials that include 2 electromagnetically distinct added tracer materials from the example analysis of FIGS. 6-7.

DETAILED DESCRIPTION AND BEST MODE OF THE DISCLOSURE

Figure 1:
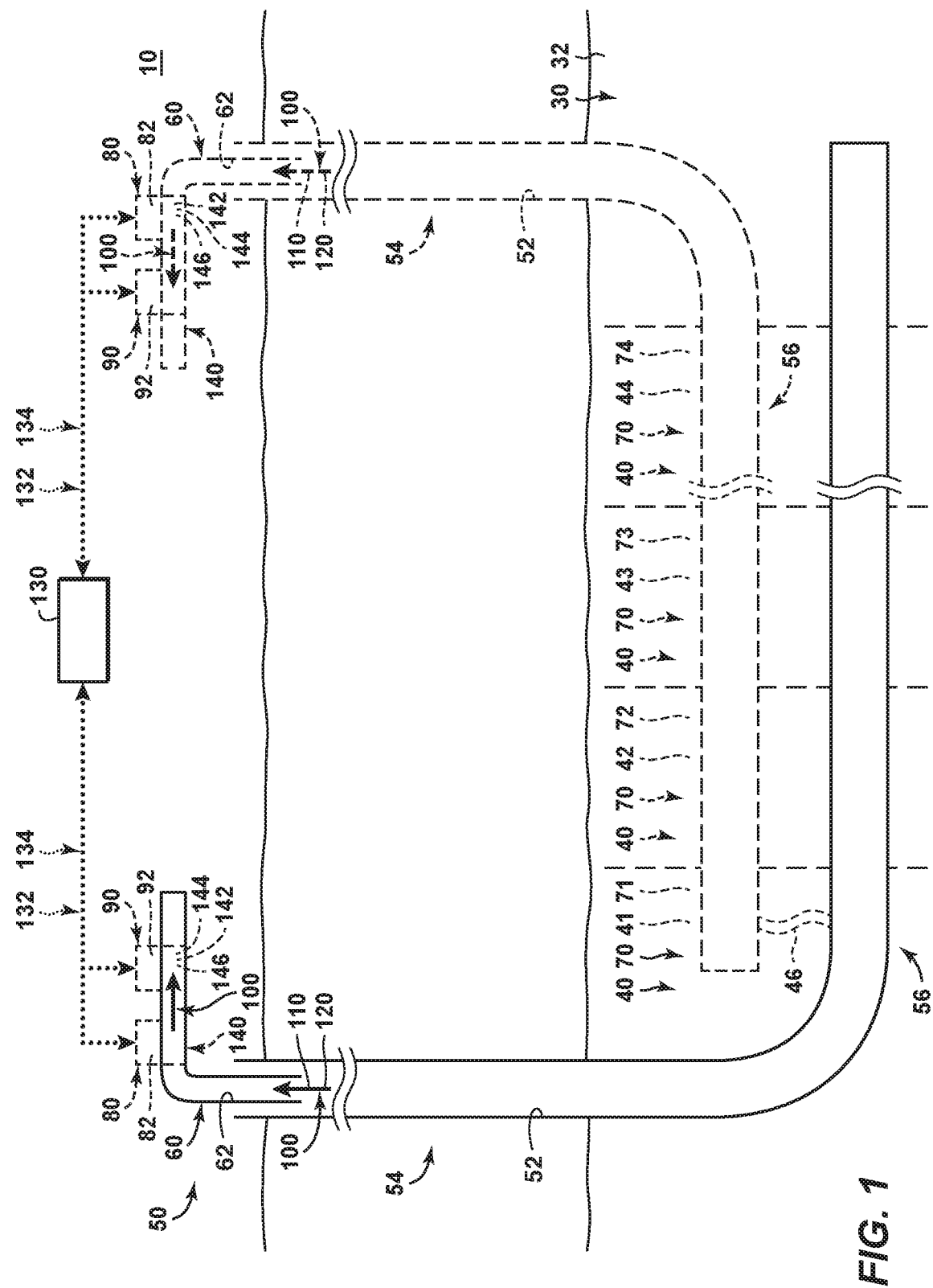
FIG. 1 is a schematic representation of examples of a hydrocarbon well that may perform and/or may be utilized with methods, according to the present disclosure.

FIGS. 1-12 provide examples of hydrocarbon wells 50 and/or of methods 200, according to the present disclosure. Elements that serve a similar, or at least substantially similar, purpose are labeled with like numbers in each of FIGS. 1-12, and these elements may not be discussed in detail herein with reference to each of FIGS. 1-12. Similarly, all elements may not be labeled in each of FIGS. 1-12, but reference numerals associated therewith may be utilized herein for consistency. Elements, components, and/or features that are discussed herein with reference to one or more of FIGS. 1-12 may be included in and/or utilized with any of FIGS. 1-12 without departing from the scope of the present disclosure. In general, elements that are likely to be included in a particular embodiment are illustrated in solid lines, while elements that are optional are illustrated in dashed lines. However, elements that are shown in solid lines may not be essential and, in some embodiments, may be omitted without departing from the scope of the present disclosure.

FIG. 1 is a schematic representation of a hydrocarbon well 50 that may perform and/or may be utilized with methods 200, according to the present disclosure. Hydrocarbon well 50 includes a wellbore 52 that extends within a region 40, or within a plurality of distinct and/or spaced-apart regions 40, of a subterranean formation 30. Subterranean formation 30 may include a formation fluid 32, such as a liquid hydrocarbon, a gaseous hydrocarbon, and/or water. Wellbore 52 also may be referred to herein as extending within a sub-surface region 20 and/or as extending between a surface region 10 subterranean formation 30. Wellbore 52 may include a vertical, or at least substantially vertical, region 54 and/or a horizontal, at least substantially horizontal, and/or deviated region 56.

Hydrocarbon well 50 also includes a production tubular 60 that defines a production conduit 62. Production tubular extends at least partially within wellbore 50, as illustrated in FIG. 1, and it is within the scope of the present disclosure that the production tubular may extend along a length of wellbore 50, along a majority of the length of the wellbore, and/or along an entirety, or at least substantially an entirety, of the wellbore.

Hydrocarbon well 50 further includes an added tracer material 70, which may be positioned, placed, located, and/or present within at least one region 40 of the subterranean formation. Added tracer material 70 also may be referred to herein as a non-native tracer material 70, a not naturally present tracer material 70, an artificially present tracer material 70, and/or an artificial tracer material 70. Added tracer material 70 may be man-made and/or may be purposefully and/or selectively positioned within subterranean formation 30 and/or within region(s) 40 thereof, and examples of the added tracer material are disclosed herein.

Hydrocarbon well 50 may be configured to produce a produced stream 100, which may flow within production tubular 60. Produced stream 100 may include a produced fluid 110, which is produced by region(s) 40. Produced stream 100 also includes a produced tracer material 120, which flows from region(s) 40 with and/or within the produced fluid. Stated another way, produced tracer material 120 includes a portion, a fraction, and/or a subset of added tracer material 70 that is produced from the subterranean formation with and/or within produced stream 100.

Hydrocarbon well 50 also includes an electromagnetic transmitter 80, an electromagnetic receiver 90, and a controller 130. Electromagnetic transmitter 80 may be configured to provide an input electromagnetic signal 82 to a region of production conduit 62 to electromagnetically excite produced tracer material 120 that is within the production tubular. Electromagnetic receiver 90 may be configured to receive an output electromagnetic signal 92 from the region of the production conduit. The electromagnetic signal may be generated by produced tracer material 120 responsive to electromagnetic excitation of the produced tracer material by the input electromagnetic signal. Controller 130 may be adapted, configured, designed, and/or programmed to identify the region of the subterranean formation based, at least in part, on the output electromagnetic signal. This may include performing any suitable portion and/or step of any of methods 200, which are discussed in more detail herein, sending any suitable control signal 132 to electromagnetic transmitter 80 and/or to electromagnetic receiver 90, and/or receiving any suitable response signal 134 from the electromagnetic transmitter and/or from the electromagnetic receiver.

As discussed, and as illustrated in dashed lines in FIG. 1, subterranean formation 30 may include a plurality of spaced-apart regions 40. This may include a first region 41, a second region 42, an optionally third region 43, etc. up to an Nth region 44. Each region may include a corresponding added tracer material 70, and the added tracer material in a given region 40 may differ from the added tracer material in each other region 40. Stated another way, first region 41 may include a first tracer material 71, second region 42 may include a second tracer material 72, third region 43 may include a third tracer material 73, Nth region 44 may include an Nth tracer material 74, etc. The first tracer material, the second tracer material, the third tracer material, and the Nth tracer material may be different, or electromagnetically distinct, from one another.

It is within the scope of the present disclosure that subterranean formation 30 may include any suitable number of regions 40. As examples, the subterranean may include at least 2, at least 3, at least 4, at least 5, at least 10, at least 20, at least 50, and/or at least 100 spaced-apart regions 40, and each region 40 may include a corresponding distinct, or electromagnetically distinct, added tracer material 70. Each region 40 may be designated and/or identified by the corresponding added tracer material 70, as discussed in more detail herein.

It is also within the scope of the present disclosure that hydrocarbon well 50 may have and/or define any suitable length. As examples, hydrocarbon well 50 may extend at least 1,000, at least 2,000, at least 5,000, at least 10,000, at least 15,000, or at least 20,000 meters within the subsurface region.

It is within the scope of the present disclosure that the hydrocarbon well is a first hydrocarbon well and that a second hydrocarbon well also extends within the region of the subterranean formation. The second hydrocarbon well may be similar, or at least substantially similar, to the first hydrocarbon well and is illustrated in dashed lines in FIG. 1.

Under these conditions, controller 130 may be programmed to identify the presence of a fracture intersection 46 between the first hydrocarbon well and the second hydrocarbon well. The fracture intersection may extend within the region of the subterranean formation and may be identified based upon the output electromagnetic signal and/or based upon production of produced tracer material 120 from the second hydrocarbon well, as discussed in more detail herein.

During operation of hydrocarbon well 50, and as discussed in more detail herein with reference to methods 200, produced stream 100 may be produced from the region of the subterranean formation with, via, and/or utilizing the hydrocarbon well. Additionally or alternatively, produced stream 100 may be produced from each region 40, or from a plurality of regions 40, of the subterranean formation.

When the subterranean formation includes a single region 40, added tracer material 70 that is associated with that single region 40 may form and/or define the produced tracer material. Alternatively, when the subterranean formation includes a plurality of regions 40 with corresponding added tracer materials 70, a plurality of distinct added tracer materials 70 may form and/or define the produced tracer material. Thus, produced tracer material 120 may include a single added tracer material 170 or a plurality of distinct added tracer materials 70.

During production, produced stream 100 may flow through production conduit 62. Additionally or alternatively, produced stream 100 may be collected within a collection vessel 140, such as with, via, and/or utilizing any suitable filter 142, magnet 144, and/or surface 146.

Electromagnetic transmitter 80 may provide input electromagnetic signal 82 to produced stream 100. Stated another way, electromagnetic transmitter 80 may irradiate produced stream 100, including produced tracer material 120 thereof, with the input electromagnetic signal. Produced tracer material 120 may interact with the input electromagnetic signal and may produce and/or generate output electromagnetic signal 92, which may differ from the input electromagnetic signal, as discussed in more detail herein. Electromagnetic receiver 90 may receive the output electromagnetic signal, and controller 130 may identify the region of the subterranean formation based, at least in part, on the output electromagnetic signal.

As an example, controller 130 may calculate a phase shift as a function of frequency between the input electromagnetic signal and the output electromagnetic signal. Controller 130 then may access an index that correlates a critical frequency of the tracer material to the region of the subterranean formation and may identify the region of the subterranean formation based, at least in part, on the critical frequency of the phase shift as the function of frequency and the tabulation. This may include identifying which region 40 of the plurality of regions 40 produced the produced fluid stream and/or estimating a fraction, or a percentage, of the produced fluid stream that is produced from each region 40 of the plurality of regions 40.

As another example, controller 130 may calculate an amplitude shift between the input electromagnetic signal and the output electromagnetic signal. Controller 130 then may access an index that correlates the amplitude shift to the region of the subterranean formation and may identify the region of the subterranean formation based, at least in part, on the amplitude shift and the tabulation. This may include identifying which region 40 of the plurality of regions 40 produced the produced fluid stream and/or estimating a fraction, or a percentage, of the produced fluid stream that is produced from each region 40 of the plurality of regions 40.

It is within the scope of the present disclosure that the input electromagnetic signal and/or the output electromagnetic signal may include, or be, any suitable signal that may interact with added tracer material 70. As examples, the input electromagnetic signal may include, or be, an input AC electromagnetic signal, an input AC electric signal, and/or an input AC magnetic signal. Similarly, the output electromagnetic signal may include, or be, an output AC electromagnetic signal, an output AC electric signal, and/or an output AC magnetic signal.

Figure 2:
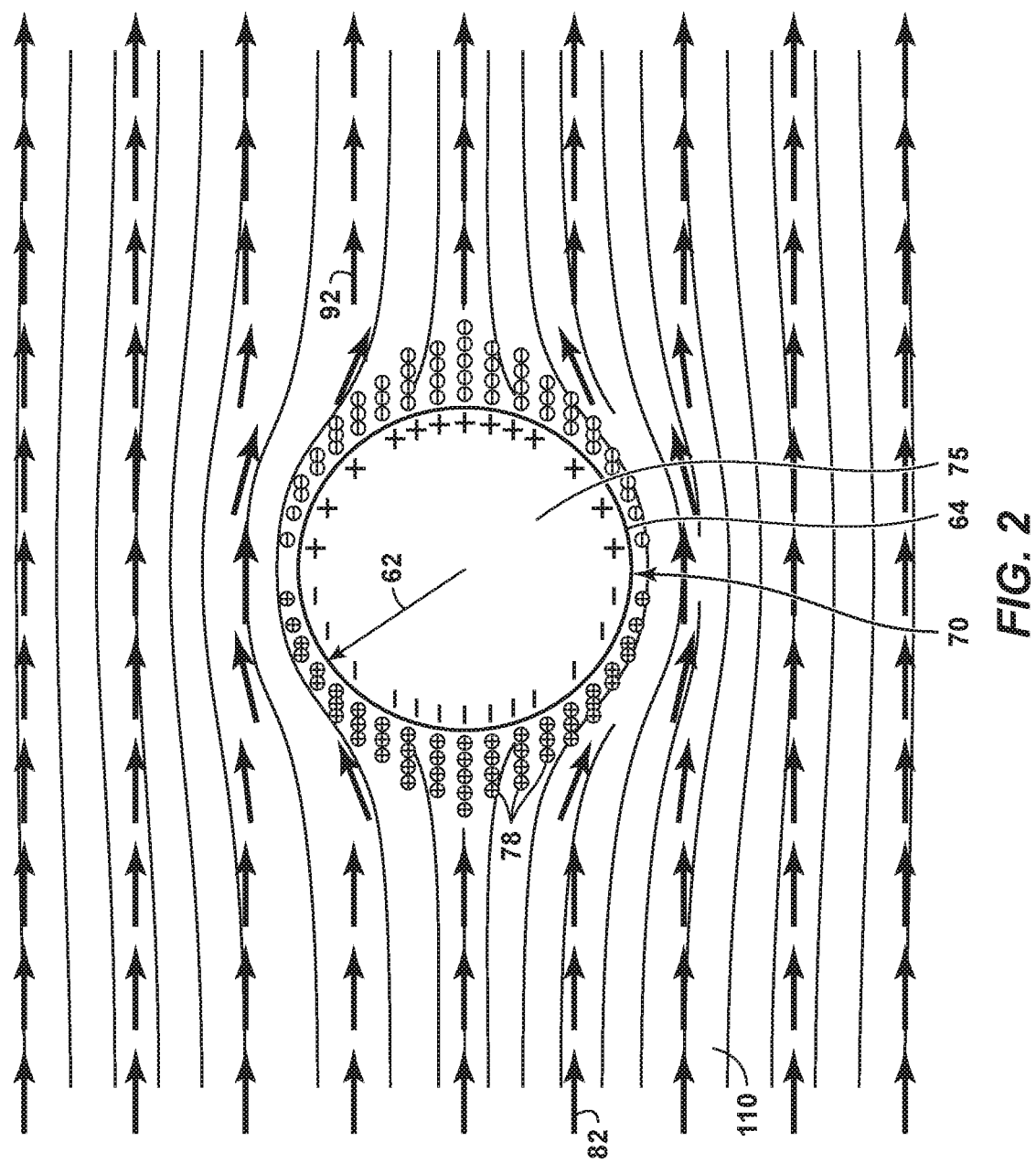
FIG. 2 is a schematic representation of an added tracer material, according to the present disclosure, in the form of a particle, that is suspended within a produced fluid and interacting with an input electromagnetic signal to generate an output electromagnetic signal.

FIG. 2 is a schematic representation of an added tracer material 70, according to the present disclosure, in the form of a particle 75, that is suspended within a produced fluid 110 and interacting with an input electromagnetic signal 82 to generate an output electromagnetic signal 92. As discussed in more detail herein, particle 75 may be a single-component particle defined solely by added tracer material 70 or a composite particle that includes added tracer material 70 together with one or more other materials.

Added tracer material 70 generally is electrically conductive, with a conductivity that is similar to, higher than, or significantly higher than, the surrounding produced fluid. As examples, the electrical conductivity of added tracer material 70 may be at least one third the electrical conductivity of the surrounding produced fluid, at least equal to the electrical conductivity of the surrounding produced fluid, at least three times the electrical conductivity of the surrounding produced fluid, and/or at least ten times the electrical conductivity of the surrounding produced fluid.

As such, the tracer material interacts with input electromagnetic signal 82 via charge accumulation at and/or near an outer surface 64 of the tracer material, as indicated by the "+" and "−" signs in FIG. 2. This charge accumulation, within the tracer material, is balanced by a corresponding accumulation of charged particles 78 near outer surface 64 and within produced fluid 110. This accumulation of charged particles 78, which physically move, or oscillate, under the influence of input electromagnetic signal 82, causes a capacitive phase shift between the current density and the electric field, wherever the tracer particles are present. The capacitive phase shift corresponds to the phase of the electric field lagging the phase of the current density and is dependent upon characteristics of added tracer material 70 and/or of particle 75 that may be selected and/or designed. Thus, the resulting change in the relationship between the input electromagnetic signal 82 and output electromagnetic signal 92 may be specific to a given added tracer material 70 and may be utilized by hydrocarbon well 50 and/or by methods 200 to detect the presence and/or quantity of the given added tracer material within the produced fluid stream, as discussed in more detail herein.

Figure 3:
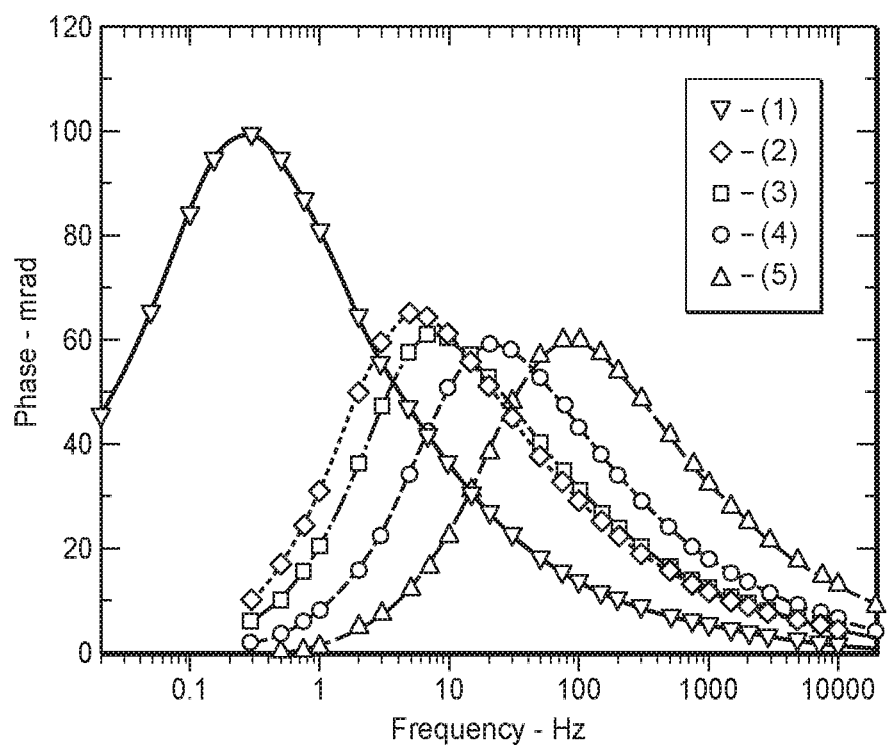
FIG. 3 is a plot illustrating a phase shift between a current density and an electric field for tracer materials that are in a produced fluid, according to the present disclosure, as a function of frequency of the input electromagnetic signal.
Figure 4:
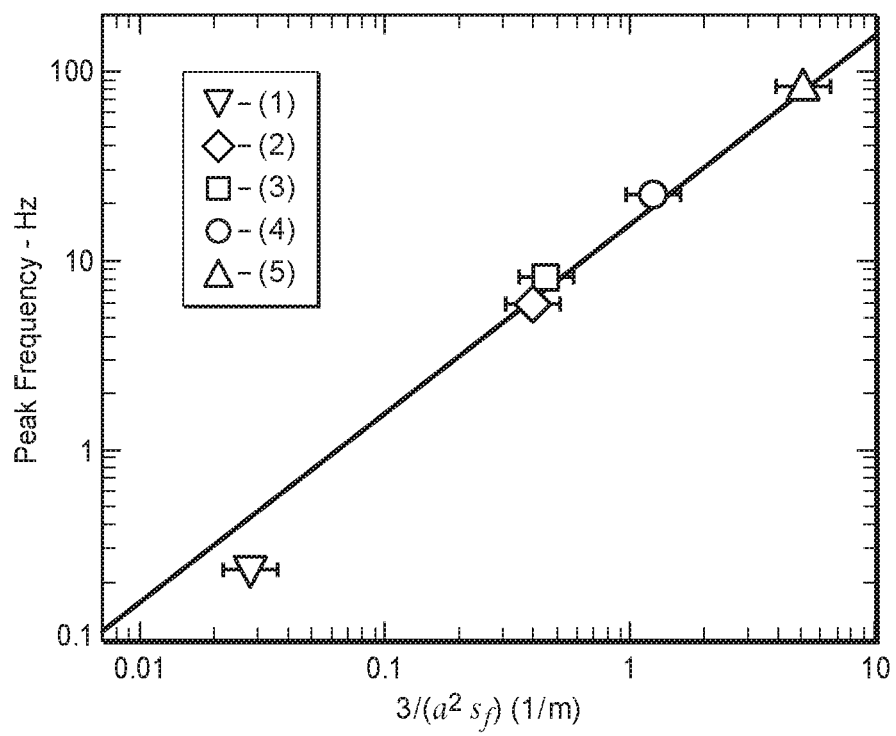
FIG. 4 is a plot illustrating a peak frequency for the tracer materials of FIG. 3 as a function of a size parameter of the tracer material.

FIG. 3 is a plot illustrating a phase shift between a current density and an electric field for added tracer materials 70 that are in a produced fluid 110, according to the present disclosure, as a function of frequency of the input electromagnetic signal. This phase shift as a function of frequency is plotted for a plurality of different tracer materials. FIG. 4 is a plot illustrating a peak frequency for the tracer materials of FIG. 3 as a function of a size parameter of the tracer material. When the conductivity of the added tracer material 70 is substantially greater than the conductivity of the surrounding produced fluid 110, the maximum phase shift exhibited in the phase shift vs. frequency plot of FIG. 3 may be described by equation (1):

$$\phi_c = \frac{9}{4} \frac{v_{cond}}{1 + 3v_{cond}} \quad (1)$$

where $\phi_c$ is the maximum phase shift (i.e., a peak in the phase shift vs. frequency plot of FIG. 3) and $v_{cond}$ is a volume fraction of the tracer material in the media within which the measurement is performed (e.g., the produced stream). Stated another way, and as discussed in more detail herein with reference to FIG. 5, methods 200 may measure the phase shift in the output electromagnetic signal as a function of the frequency of the input electromagnetic signal within a given region of the subterranean formation. These methods then may determine a maximum value, or magnitude, of the phase shift and may utilize this maximum value of the phase shift to calculate the volume fraction of the tracer material within the produced stream, such as via inversion of equation (1).

The frequency at which the maximum value of the phase shift occurs, which also may be referred to herein as a peak frequency, as a critical frequency of the tracer material, and/or as a critical frequency of the phase shift as a function of frequency, may be described by equation (2):

$$f_c = \frac{\sigma_w}{\pi C_o} \frac{3}{a^2 s_f} \quad (2)$$

where $f_c$ is the critical frequency of the tracer material, $\sigma_w$ is the produced fluid electrical conductivity, $C_o$ is the electrode-electrolyte capacitance per unit area for the tracer material, a is the average effective particle radius of the tracer material, which is indicated in FIG. 2 at 62, and $s_f$ is the surface area to volume ratio for the tracer material.

As indicated by equation (2), an electrode-electrolyte capacitance per unit area of the added tracer material may be inversely proportional to the critical frequency, may be proportional to an electrical conductivity of the produced fluid, may be inversely proportional to a square of an average effective particle radius of the added tracer material, and/or may be inversely proportional to a surface area to volume ratio of the added tracer material. Similarly, the surface area to volume ratio of the added tracer material may be inversely proportional to the critical frequency of the added tracer material, may be proportional to an electrical conductivity of the produced fluid, may be inversely proportional to a square of an average effective particle radius of the added tracer material, and/or may be inversely proportional to the electrode-electrolyte capacitance per unit area of the added tracer material. In addition, a product of the electrode-electrolyte capacitance per unit area of the added tracer material and the surface area to volume ratio of the added tracer material may be inversely proportional to the critical frequency of the added tracer material, may be proportional to the electrical conductivity of the produced fluid, and/or may be inversely proportional to a square of the average effective particle radius of the added tracer material.

FIG. 4 illustrates a fit of equation 2 to the experimental data of FIG. 3. As may be seen in FIG. 4, the size parameter (i.e., $3/a^2 s_f$) of the tracer material may be utilized to predict, regulate, and/or specify the critical frequency of the tracer material, $f_c$. Particles in the tracer material may be formed from a porous conductor whose effective radius and surface area to volume ratio may be tailored to the specific needs of each application. As such, and as discussed in more detail herein with reference to methods 200, the tracer material may be selected to have a desired, target, and/or specified critical frequency via variation of the size parameter of the tracer material, which may permit different and/or distinct tracer materials, with known and/or predictable properties, to be positioned and/or utilized within each region of the subterranean formation.

The present disclosure recognizes that naturally occurring materials, which are present within a subterranean formation, generally exhibit very little capacitive behavior and instead behave more as electrical insulators. Furthermore, whenever present, the capacitive behavior is typically exhibited over a much broader frequency range. As such, the produced tracer material generally will be readily distinguished from other particulate matter that is produced from the subterranean formation within the produced stream. However, for formations that exhibit some level of capacitive behavior, the critical frequency of the tracer material may be chosen sufficiently away from the characteristic relaxation time of the materials that comprise the subterranean formation and/or that are likely to be produced, from the subterranean formation, within the produced stream.

In addition, the propagation of the electromagnetic signal in a conductor causes inductive phase shifts between the input electromagnetic signal and output electromagnetic signal, wherein the electric field leads the current density. Thus, the capacitive phase shift caused by the tracer material, when present, provides a significant amount of contrast, or signal differentiation, which may be utilized to identify the produced tracer material within the produced stream and/or the region of the subterranean formation from which the produced tracer material was produced.

Added tracer material 70 may include and/or be any suitable tracer material that may capacitively interact with input electromagnetic signal 82 to produce and/or generate output electromagnetic signal 92, as illustrated in FIGS. 1-2. As examples, added tracer material 70 may include one or more of a particulate carbon black material, a particulate mesoporous carbon black material, a particulate activated carbon material, a particulate electrically conductive material, a particulate metal, pyrite, iron sulfide, and/or a Janus particle. When the tracer material includes the Janus particle, the Janus particle may include two different, or distinct, regions and/or components. These two distinct regions, or components, may facilitate segregation of the Janus particle at an interface that extends within the subterranean formation. Examples of the interface include an oil-water interface, an air-water interface, an air-oil interface, a rock-water interface, and/or a rock-oil interface.

It is within the scope of the present disclosure that added tracer material 70 may include, consist of, and/or consist essentially of a single material and/or a homogeneous material. Alternatively, it is also within the scope of the present disclosure that added tracer material 70 may form a portion of a composite particle that includes one or more other materials. An example of such a composite particle may include the Janus particle. As another example, the composite particle may include a core material that is coated with the tracer material. More specific examples of the core material include a ceramic material, a magnetic material, a ferromagnetic material, and/or a proppant.

Figure 5:
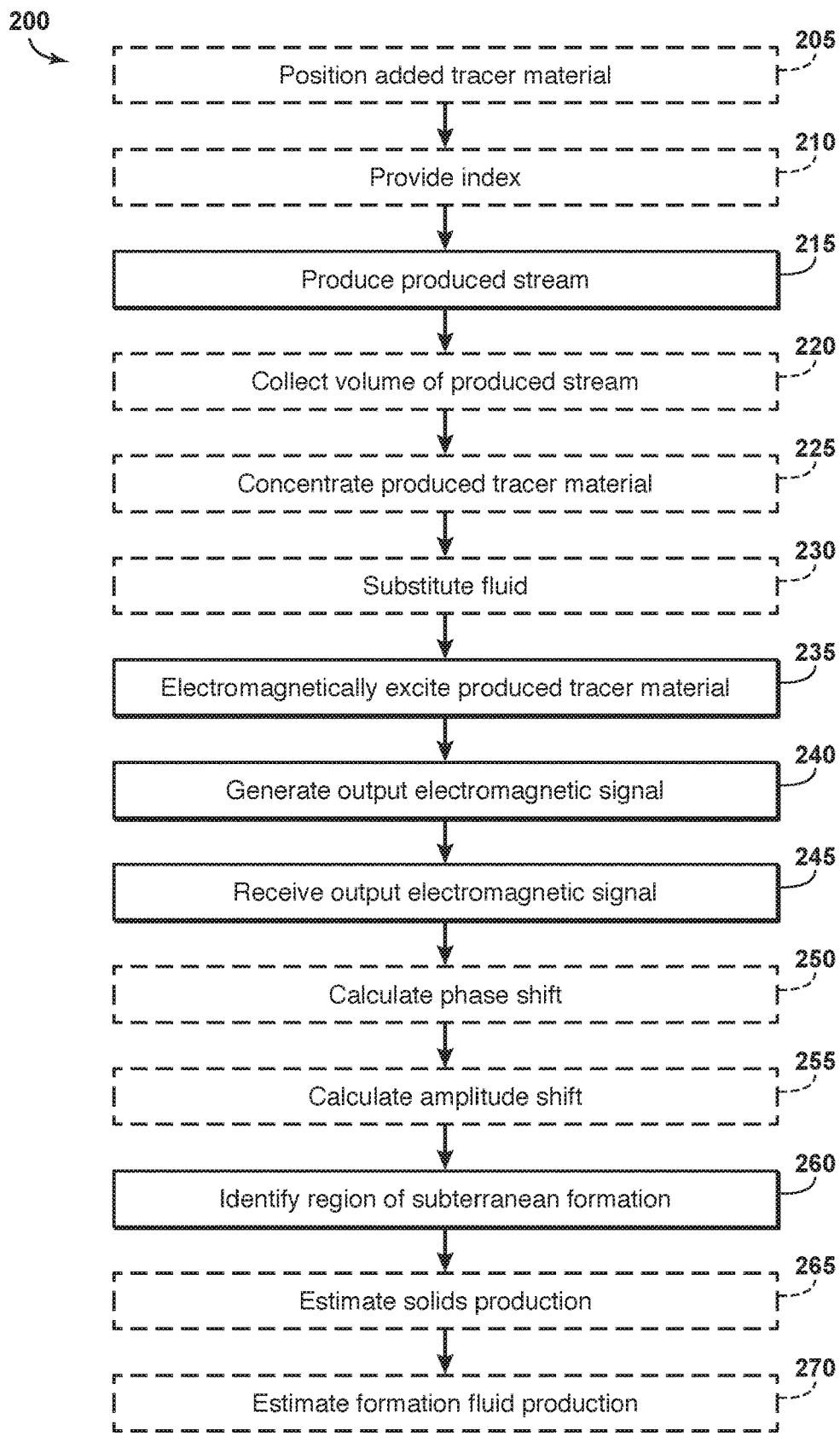
FIG. 5 is a flowchart depicting examples of methods, according to the present disclosure, of monitoring production of fluids from a subterranean formation.

FIG. 5 is a flowchart depicting examples of methods 200, according to the present disclosure, of monitoring production of fluids from a subterranean formation, such as via a hydrocarbon well that extends within the subterranean formation. Methods 200 may include positioning an added tracer material at 205 and/or providing an index at 210 and include producing a produced stream at 215. Methods 200 also may include collecting a volume of the produced stream at 220, concentrating a produced tracer material at 225, and/or substituting a fluid at 230. Methods 200 include electromagnetically exciting the produced tracer material at 235, generating an output electromagnetic signal at 240, and receiving the output electromagnetic signal at 245. Methods 200 also may include calculating a phase shift at 250 and/or calculating an amplitude shift at 255 and include identifying a region of the subterranean formation at 260. Methods 200 further may include estimating solids production at 265 and/or estimating formation fluid production at 270.

Positioning the added tracer material at 205 may include positioning the added tracer material within the region of the subterranean formation. It is within the scope of the present disclosure that the positioning at 205 may include positioning a single added tracer material, examples of which are disclosed herein, within a single region of the subterranean formation. Additionally or alternatively, it is also within the scope of the present disclosure that the hydrocarbon well may extend within a plurality of spaced-apart regions of the subterranean formation, such as regions 40 of FIG. 1. Under these conditions, the positioning at 205 may include positioning a corresponding added tracer material, which differs from each other added tracer material, in and/or within each of the plurality of spaced-apart regions of the subterranean formation.

The positioning at 205 may include positioning the added tracer material in any suitable manner. As an example, the positioning at 205 may include flowing the added tracer material into the region of the subterranean formation. This may include injecting the added tracer material into the region of the subterranean formation via the hydrocarbon well, pumping a slurry of the added tracer material and a carrier fluid into the region of the subterranean formation via the hydrocarbon well, stimulating the region of the subterranean formation during the flowing, and/or propping at least one fracture, which extends within the region of the subterranean formation, with the added tracer material. It is within the scope of the present disclosure that the positioning at 205 may include flowing the added tracer material into the subterranean formation for at least a threshold flow time prior to the electromagnetically exciting at 235, such as to provide for flow of a desired volume of the added tracer material within the region of the subterranean formation. Additionally or alternatively, it is also within the scope of the present disclosure that methods 200 further may include waiting at least a threshold wait time subsequent to the positioning at 205 and prior to the electromagnetically exciting at 235, such as to permit and/or facilitate penetration of the added tracer material into the region of the subterranean formation. Examples of the threshold flow time include threshold flow times of at least 1 minute, at least 10 minutes, at least 30 minutes, at least 1 hour, at least 2 hours, at least 4 hours, at least 12 hours, at least 1 day, at least 2 days, at least 10 days, at least 25 days, at least 50 days, at least 100 days, at least 180 days, and/or at least 365 days. Examples of the threshold wait time include threshold wait times of at least 1 minute, at least 10 minutes, at least 30 minutes, at least 1 hour, at least 2 hours, at least 4 hours, at least 12 hours, at least 1 day, at least 2 days, at least 10 days, at least 25 days, at least 50 days, at least 100 days, at least 180 days, and/or at least 365 days.

When the positioning at 205 includes positioning the corresponding added tracer material within each region of the plurality of spaced-apart regions, the positioning at 205 further may include positioning each corresponding added tracer material in any suitable manner. As an example, the positioning at 205 may include sequentially positioning electromagnetically distinct added tracer materials in and/or within each region of the plurality of spaced-apart regions. As another example, the positioning at 205 may include flowing the corresponding added tracer material into each region of the plurality of spaced-apart regions. As yet another example, the positioning at 205 may include positioning during, at least partially concurrently with, and/or as a part of completion of each region of the plurality of spaced-apart regions.

As discussed herein with reference to FIG. 1, the hydrocarbon well may include and/or be a first hydrocarbon well, and a second hydrocarbon well also may extend within the region of the subterranean formation. Under these conditions, the positioning at 205 may include positioning the added tracer material within the region of the subterranean formation via the second hydrocarbon well, and the producing at 215 may include producing the produced stream from the second hydrocarbon well. In this example, the identifying at 260, which is discussed in more detail herein, may include identifying the presence of a fracture intersection, within the region of the subterranean formation, that extends between the first hydrocarbon well and the second hydrocarbon well. This identifying may be based, at least in part, on the output electromagnetic signal that is received during the receiving at 245 and/or based, at least in part, on production of the produced tracer material from the first hydrocarbon well.

As discussed, the subterranean formation may include a plurality of spaced-apart, or distinct, regions, and each region of the plurality of regions may include a corresponding added tracer material. Under these conditions, providing the index at 210 may include providing any suitable index, list, array, table, tabulation, database, and/or graph that defines, designates, identifies, and/or correlates each added tracer material to each region of the plurality of spaced-apart regions. Stated another way, the index may provide a one-to-one correspondence between a property and/or an identity of each added tracer material and a corresponding region of the subterranean formation within which the added tracer material is positioned, such as during the providing at 210.

Producing the produced stream at 215 may include producing any suitable produced stream from the region of the subterranean formation and/or via the hydrocarbon well. The region of the subterranean formation may include the added tracer material and a formation fluid, and the produced stream may include a produced fluid and a produced tracer material. The produced fluid may include a fraction, a subset, and/or a portion of the formation fluid. The produced tracer material may include a particulate tracer that defines a tracer electrical capacitance that differs from a fluid electrical capacitance of the produced fluid, as discussed herein.

The producing at 215 may include producing the produced stream in any suitable manner. As an example, the producing at 215 may include flowing the produced stream from the region of the subterranean formation via a wellbore, such as wellbore 52 of FIG. 1, of the hydrocarbon well. This may include concurrent, at least substantially concurrently, simultaneously, and/or at least substantially simultaneously producing both the produced fluid and the produced tracer material.

It is within the scope of the present disclosure that the produced fluid may include any suitable fluid, examples of which include a liquid, a gas, a hydrocarbon, natural gas, oil, and/or water. It is also within the scope of the present disclosure that the produced stream further may include additional solid and/or particulate material, examples of which include solids, fines, sand, and/or proppant. Under these conditions, the produced tracer material may be, or may be selected to be, distinct, electromagnetically distinct, and/or capacitively distinct from the additional solid and/or particulate material. This may permit and/or facilitate detection of the produced tracer material within the produced stream and/or to permit and/or facilitate distinguishing the produced tracer material from the additional solid and/or particulate material.

Collecting the volume of the produced stream at 220 may include collecting any suitable volume of the produced stream in any suitable manner, such as within collection vessel 140 of FIG. 1. When methods 200 include the collecting at 220, the collecting at 220 may be performed at least partially responsive to the producing at 215 and/or at least partially prior to the electromagnetically exciting at 235. The collecting at 220 may be performed within and/or proximate a surface region, such as surface region 10 of FIG. 1.

When methods 200 include the collecting at 220, the electromagnetically exciting at 235 may include electromagnetically exciting a portion of the produced tracer material that was collected during the collecting at 220. In addition, the generating at 240 may include generating the output electromagnetic signal with the portion of the produced tracer material that was collected during the collecting at 220 and/or the receiving at 245 may include receiving the output electromagnetic signal from the portion of the produced tracer material that was collected during the collecting at 220.

Concentrating the produced tracer material at 225 may include concentrating the produced tracer material, such as within the collection vessel, to produce and/or generate a concentrated produced tracer material. This may increase and/or improve a signal-to-noise ratio for the receiving at 245 by increasing a concentration and/or quantity of the produced tracer material that is electromagnetically excited during the electromagnetically exciting at 235. The concentrating at 225 may be performed at least partially responsive to the producing at 215 and/or at least partially prior to the electromagnetically exciting at 235.

The concentrating at 225 may include concentrating the produced tracer material in any suitable manner. As an example, the concentrating at 225 may include filtering the produced stream to separate the produced tracer material from the produced fluid and concentrate the produced tracer material. This may include filtering with, via, and/or utilizing a filter, such as filter 142 of FIG. 1. As another example, the concentrating at 225 may include magnetically collecting the produced tracer material. This may include magnetically collecting a produced tracer material that is ferromagnetic with, via, and/or utilizing a magnet, such as magnet 144 of FIG. 1. As yet another example, the concentrating at 225 may include adhering the produced tracer material to a surface, such as surface 146 of FIG. 1.

When methods 200 include the concentrating at 225, the methods also may include physically separating the concentrated produced tracer material, such as based upon a physical property of the produced tracer material. Examples of physical property of the produced tracer material include a size, a weight, a volume, a dimension, a diameter, a density, and/or a magnetic property of the tracer material particles that comprise the concentrated produced tracer material. This may include physical separation to produce and/or generate a plurality of tracer material subsets of the concentrated produced tracer material. Each tracer material subset in the plurality of tracer material subsets may have and/or exhibit a distinct physical property, examples of which are discussed above, that may permit and/or facilitate the physically separating, and the physically separating may permit and/or facilitate further distinction among the tracer material subsets.

As an example, added tracer materials with the same or similar critical frequencies, $f_c$, such as may be described by equation (2), but with different diameters may be positioned within distinct regions of the subterranean formation, such as during the positioning at 205. Under these conditions, the index, such as may be provided during the providing at 210, may include information regarding both the diameter and the critical frequency of the added tracer materials.

Subsequently, a portion of these added tracer materials may be produced from the subterranean formation, such as during the producing at 210, and concentrated, such as during the concentrating at 225, to produce the concentrated produced tracer material. The concentrated produced tracer material then may be physically separated, as discussed herein, to generate the plurality of tracer material subsets. Optionally, the physical separation may occur prior to the concentrating at 225 and/or as part of the concentrating at 225. Through knowledge of both the critical frequency and the diameter of the added tracer materials, the region(s) of the subterranean formation that produced each of the tracer material subsets then may be identified, such as via independently performing a remainder of methods 200, which are discussed herein, on each of the tracer material subsets.

When methods 200 include the collecting at 220, the methods also may include substituting the fluid at 230. The substituting at 230 may include separating the portion of the produced tracer material, which was collected during the collecting at 220, from the produced fluid and, prior to the electromagnetically exciting at 235, mixing the portion of the produced tracer material with a measurement fluid to generate a measurement mixture. The measurement fluid may have and/or define a high electrical resistivity, a higher electrical resistivity when compared to the produced fluid, and/or a known and/or defined electrical resistivity. Under these conditions, the electromagnetically exciting at 235, the generating at 240, the receiving at 245, the calculating at 250, the calculating at 255, and/or the identifying at 260 may be performed while the portion of the produced tracer material defines the measurement mixture. Thus, the generating at 240 may include generating the output electromagnetic signal for the measurement mixture, and the identifying at 260 may include identifying based, at least in part, on the output electromagnetic signal for the measurement mixture. This may increase an accuracy of, increase a signal-to-noise ratio of, and/or decrease a variability in the identifying at 260.

When methods 200 include the substituting at 230, the measurement fluid may include and/or be a first measurement fluid, the measurement mixture may include and/or be a first measurement mixture, and the output electromagnetic signal for the measurement mixture may include and/or be an output electromagnetic signal for the first measurement mixture. Under these conditions, methods 200 and/or the substituting at 230 further may include separating the portion of the produced tracer material from the first measurement mixture, mixing the portion of the produced tracer material with a second measurement fluid, which differs from the first measurement fluid, to generate a second measurement mixture, and repeating the electromagnetically exciting at 235, the generating at 240, the receiving at 245, the calculating at 250, the calculating at 255, and/or the identifying at 260 while the produced tracer material defines the second measurement mixture to generate an output electromagnetic signal for the second measurement mixture. As such, the identifying at 260 may be based, at least in part, on the output electromagnetic signal for the first measurement mixture and on the output electromagnetic signal for the second measurement mixture, which further may increase an accuracy of the identifying at 260.

Electromagnetically exciting the produced tracer material at 235 may include electromagnetically exciting the produced tracer material with an input electromagnetic signal, such as may be generated and/or provided by electromagnetic transmitter 80 of FIG. 1. The input electromagnetic signal may vary through, throughout, and/or across an input frequency range. Stated another way, the input electromagnetic signal may scan, may scan through, and/or may systematically scan through the input frequency range. As an example, the electromagnetically exciting at 235 may include providing an input AC electromagnetic signal to facilitate capacitive coupling with the produced tracer material. Examples of the input AC electromagnetic signal include an input AC electric signal and an input AC magnetic signal.

The input frequency range may have and/or define any suitable minimum input frequency and/or maximum input frequency. Examples of the minimum input frequency include minimum input frequencies of at least 0.01 Hertz (Hz), at least 0.1 Hz, at least 1 Hz, at least 10 Hz, at least 100 Hz, at least 1,000 Hz, at least 10,000 Hz, at least 100,000 Hz, at most 1,000,000 Hz, at most 100,000 Hz, at most 10,000 Hz, at most 1,000 Hz, at most 100 Hz, and/or at most 10 Hz. Examples of the maximum input frequency include maximum frequencies of at least 1,000 Hz, at least 10,000 Hz, at least 100,000 Hz, at most 1,000,000 Hz, at most 100,000 Hz, at most 10,000 Hz, and/or at most 1,000 Hz.

The electromagnetically exciting at 235 may include electromagnetically exciting within a production tubular, such as production tubular 60 of FIG. 1, that carries the produced stream. Under these conditions, the generating at 240 may include generating within the production tubular and/or the receiving at 245 may include receiving from, or from a production conduit of, the production tubular. As such, the electromagnetic transmitter may be operatively attached to and/or may extend within the production tubular. Additionally or alternatively, and as discussed herein, the electromagnetically exciting at 235 may include electromagnetically exciting within the collection vessel and/or electromagnetically exciting the portion of the produced tracer material that was collected within the collection vessel.

Generating the output electromagnetic signal at 240 may include generating the output electromagnetic signal with the produced tracer material, such as produced tracer material 120 of FIG. 1. The generating at 240 may be responsive and/or subsequent to the electromagnetically exciting at 235, and the output electromagnetic signal may vary through, throughout, and/or across an output frequency range.

The generating at 240 may include generating the output electromagnetic signal in any suitable manner, including those that are discussed herein with reference to FIG. 2. As an example, the generating at 240 may include phase-shifting the input electromagnetic signal, with the produced tracer material, to produce and/or generate the output electromagnetic signal. As another example, the generating at 240 may include amplitude-modulating the input electromagnetic signal, with the produced tracer material, to produce and/or generate the output electromagnetic signal.

Receiving the output electromagnetic signal at 245 may include receiving the output electromagnetic signal from the produced tracer material and/or receiving the output electromagnetic signal with an electromagnetic receiver, such as electromagnetic receiver 90 of FIG. 1. Similar to the electromagnetic transmitter, the electromagnetic receiver may be operatively attached to and/or may extend within the production tubular.

The receiving at 245 may include receiving an output AC electromagnetic signal, such as an output AC electric signal and/or an output AC magnetic signal. The output electromagnetic signal may correspond to the input electromagnetic signal but may be at least partially phase-shifted and/or amplitude-shifted, as discussed herein. The output frequency range may have a minimum output frequency and/or a maximum output frequency. Examples of the minimum output frequency are discussed herein with reference to the minimum input frequency. Examples of the maximum output frequency are discussed herein with reference to the maximum input frequency.

Calculating the phase shift at 250 may include calculating a phase shift as a function of frequency between the input electromagnetic signal and the output electromagnetic signal, such as via controller 130 of FIG. 1. This may include calculating a capacitive phase shift between a current density and an electric field of the input electromagnetic signal and a current density and an electric field of the output electromagnetic signal.

The calculating at 250 may be performed subsequent to the receiving at 245 and/or to prior to the identifying at 260, and the identifying at 260 may be based, at least in part, on a critical, or a peak, frequency of the phase shift as the function of frequency. Examples of the critical frequency and/or of how the critical frequency varies with various properties of the added tracer material are discussed herein with reference to FIGS. 3-4. The critical frequency may be defined as a maximum phase shift value in the phase shift as the function of frequency and may be described by equation (2).

Calculating the amplitude shift at 255 may include calculating the amplitude shift as a function of frequency between the input electromagnetic signal and the output electromagnetic signal, such as via controller 130 of FIG. 1. This may include calculating an amplitude modulation between a current density and an electric field of the input electromagnetic signal and a current density and an electric field of the output electromagnetic signal. Additionally or alternatively, the calculating at 255 may include quantifying the amplitude shift as a function of frequency of the input electromagnetic signal. The calculating at 255 may be performed subsequent to the receiving at 245 and/or prior to the identifying at 260, and the identifying at 260 may be based, at least in part, on the amplitude shift.

Identifying the region of the subterranean formation at 260 may include identifying the region of the subterranean formation based, at least in part, on the output electromagnetic signal. When the subterranean formation includes a single region and/or when only a single region includes the added tracer material, the identifying at 260 may include identifying based upon detection of an electromagnetic property of the added tracer material, such as the phase shift and/or the amplitude shift discussed herein, within the produced stream. Additionally or alternatively, when the subterranean formation includes a plurality of spaced-apart regions with corresponding added tracer materials, the identifying at 260 may include identifying which region of the plurality of spaced-apart regions produced the produced tracer material. This may be based, at least in part, on the output electromagnetic signal and on the index that is discussed herein with reference to the providing at 210.

As an example, the identifying at 260 may include estimating solids production at 265. This may include estimating solids production from a given region of the plurality of spaced-apart regions based, at least in part, on the identifying at 260, estimating solids production from at least two regions of the plurality of spaced-apart regions based, at least in part, on the identifying, estimating solids production from each region of the plurality of spaced-apart regions based, at least in part, on the identifying, and/or estimating a fraction of the produced tracer material produced from a given, or from each, region of the plurality of spaced-apart regions based, at least in part, on the identifying.

As another example, the identifying at 260 may include estimating formation fluid production at 270. This may include estimating formation fluid production from a given region of the plurality of spaced-apart regions based, at least in part, on the identifying at 260, estimating formation fluid production from at least two regions of the plurality of spaced-apart regions based, at least in part, on the identifying, estimating formation fluid production from each region of the plurality of spaced-apart regions based, at least in part, on the identifying, and/or estimating a fraction of the produced fluid produced from a given, or from each, region of the plurality of spaced-apart regions based, at least in part, on the identifying.

An example of the analysis that may be performed by hydrocarbon wells 50 and that may be utilized during methods 200, according to the present disclosure, is presented below. In this example, a model produced stream, such as produced stream 100 that may be produced from hydrocarbon well 50 of FIG. 1, includes a produced fluid, such as produced fluid 110, and a plurality of electromagnetically distinct produced tracer materials, such as produced tracer material 120 of FIG. 1. In this example, each electromagnetically distinct produced tracer material may be assumed to have been positioned within a corresponding region of the subterranean formation and subsequently produced from the corresponding region of the subterranean formation within the produced stream. As such, the presence of each electromagnetically distinct produced tracer material may be considered to correlate with production from the corresponding region of the subterranean formation. Additionally or alternatively, a relative amount of each electromagnetically distinct tracer material may be considered to correlate to a relative volume of production from the corresponding region of the subterranean formation.

The above-described model produced stream may include i electromagnetically distinct produced tracer materials included therein. The produced tracer materials of the $i^{th}$ type make up a volume fraction of $v_i$, and are characterized by their own parameter values $C_{0i}$, $a_i$, $s_{fi}$, and formation factor $F_i = \sigma_w/\sigma_{fi}$, where $\sigma_{fi}$ is the effective conductivity of the produced fluid inside the porous tracer material. The change in complex conductivity may be expressed by the linear system of equations (3):

$$\frac{\delta\sigma}{\sigma_w} = Av \qquad (3)$$

where $\delta\sigma$ is the change in total conductivity, $\sigma_w$ is the background conductivity of the produced fluid (i.e., that in which the produced tracer materials are not present, and the columns of the matrix A are unique basis functions for each particle. Note that v is a vector of real values, one volume fraction for each particle type, and A is a complex-valued matrix.

The unique basis functions are given by equation (4):

$$\frac{\delta\sigma}{\sigma_w} = v_i \frac{3(1 - \alpha(\tilde{\omega}_i)(F_i + 2))}{1 + 2\alpha(\tilde{\omega}_i)(F_i - 1)} \qquad (4)$$

where equation (5) defines:

$$\alpha(\omega) \equiv \frac{\sqrt{-i\tilde{\omega}}\cos(\sqrt{-i\tilde{\omega}}) - \sin(\sqrt{-i\tilde{\omega}})}{i\tilde{\omega}\sin(\sqrt{-i\tilde{\omega}})} \qquad (5)$$

(in equation (5) only, i represents the imaginary unit, not particle type index) equation (6) defines:

$$\tilde{\omega}_i = \frac{\omega}{\omega_i} \qquad (6)$$

and equation (7) defines:

$$\omega_i = \frac{\sigma_w}{s_{fi} F_i C_{0i} a_i^2} \qquad (7)$$

With measurements from the field, $\sigma_w$ may not be known a priori, and therefore $\delta\sigma$ also may not be known. The field measurements will be input current, $I(\omega)$, and output voltage, $V(\omega)$, both as a function of frequency. The total complex conductivity then may be determined by taking the ratio of equation (8):

$$\sigma(\omega) = \frac{I(\omega)}{V(\omega)}. \qquad (8)$$

By definition, the change relative to background may be expressed by equation (9):

$$\sigma(\omega) = \sigma_w[1 + Av]. \qquad (9)$$

Then by noting $\exp(Av) = 1 + Av + O(\|Av\|^2)$, the total conductivity as a function of frequency may be approximated by equation (10):

$$\sigma(\omega) \approx \sigma_w \exp(Av). \qquad (10)$$

The relationship between volume fraction and the complex conductivity then may be linearized by expressing them in logarithmic form. First, equation (11) defines:

$$d = \log(\sigma(\omega)). \qquad (11)$$

The result is split into real (denoted with subscript Re) and imaginary (denoted with subscript Im) components to generate equation (12) and equation (13):

$$d_{Re} \approx \log(\sigma_w) + A_{Re}v \qquad (12)$$

$$d_{Im} \approx A_{Im}v. \qquad (13)$$

The actually measured data vector is denoted with the hat, $\hat{d}$, to distinguish it from the model prediction, d. The data is inverted utilizing the misfit norm of equation (14), which is a standard approach when dealing with Gaussian-distributed errors in the measurement:

$$\|d-\hat{d}\|_2. \qquad (14)$$

Note that $\hat{d}$ and d are vectors with each element corresponding to a different frequency of measurement. In this inverse problem, it must be guaranteed that v is non-negative. This calls for the use of Non-Negative Least Squares (Lawson and Hanson, "Solving Least Squares Problems", Prentice-Hall, 1974), in light of the data misfit norm chosen above.

The inverse problem is written as the minimization of a constrained objective function, which for the full data set (real and imaginary parts), in block matrix form, is given by equation (15):

$$\min_{v\geq 0}\left\|\begin{bmatrix}1 & A_{Re}\\ 0 & A_{Im}\end{bmatrix}\begin{bmatrix}\log(\sigma_w)\\ v\end{bmatrix}-\begin{bmatrix}\hat{d}_{Re}\\ \hat{d}_{Im}\end{bmatrix}\right\|_2^2 \qquad (15)$$

Utilizing the above analysis, results are compared for solutions of the above problem and sub-problems of inverting just the real or just the imaginary data. The latter sub-problems are solved by utilizing the first or second of the block-rows above, respectively.

With 0.1% noise added to the $\sigma(\omega)$ in order to create synthetic data, d, trial inversions are performed in three ways: (a) utilizing the full complex numbers, (b) utilizing the real parts, and (c) utilizing the imaginary parts. The results are displayed in FIGS. 6-12.

The inversions are repeated for a varying number of distinct particle types (i.e., 2, 3, and 4), which exhibited complex conductivity variations within the frequency bandwidth that is expected to be measured in the field (e.g., 1 Hz-1 GHz). The result is that as the number of particle types increases, their distinguishability suffers (see FIG. 6).

Figure 6:
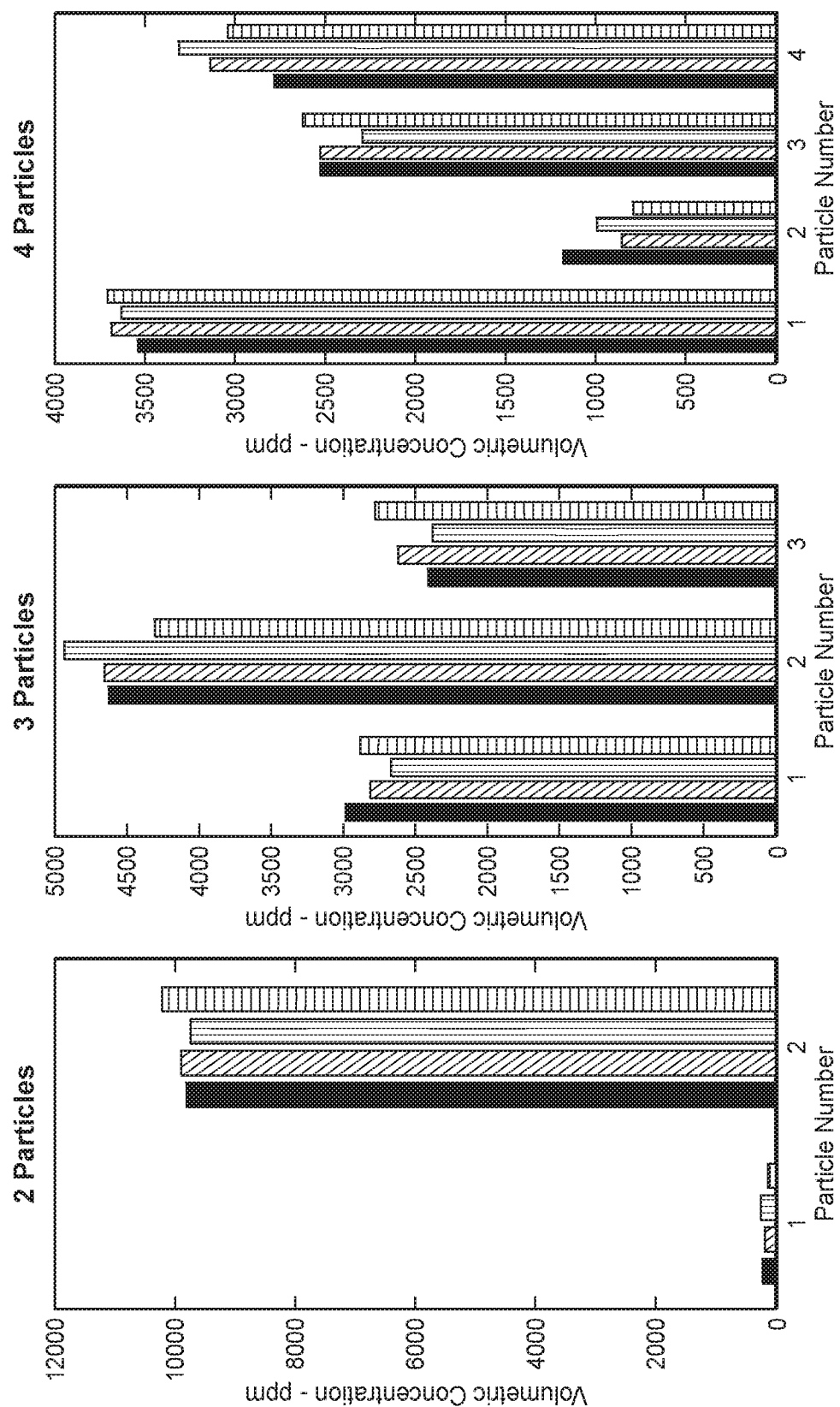
FIG. 6 is a collection of plots illustrating a determined volumetric concentration of specific produced tracer material for produced tracer materials that include 2, 3, or 4 electromagnetically distinct added tracer materials following an example analysis, according to the present disclosure.
Figure 9:
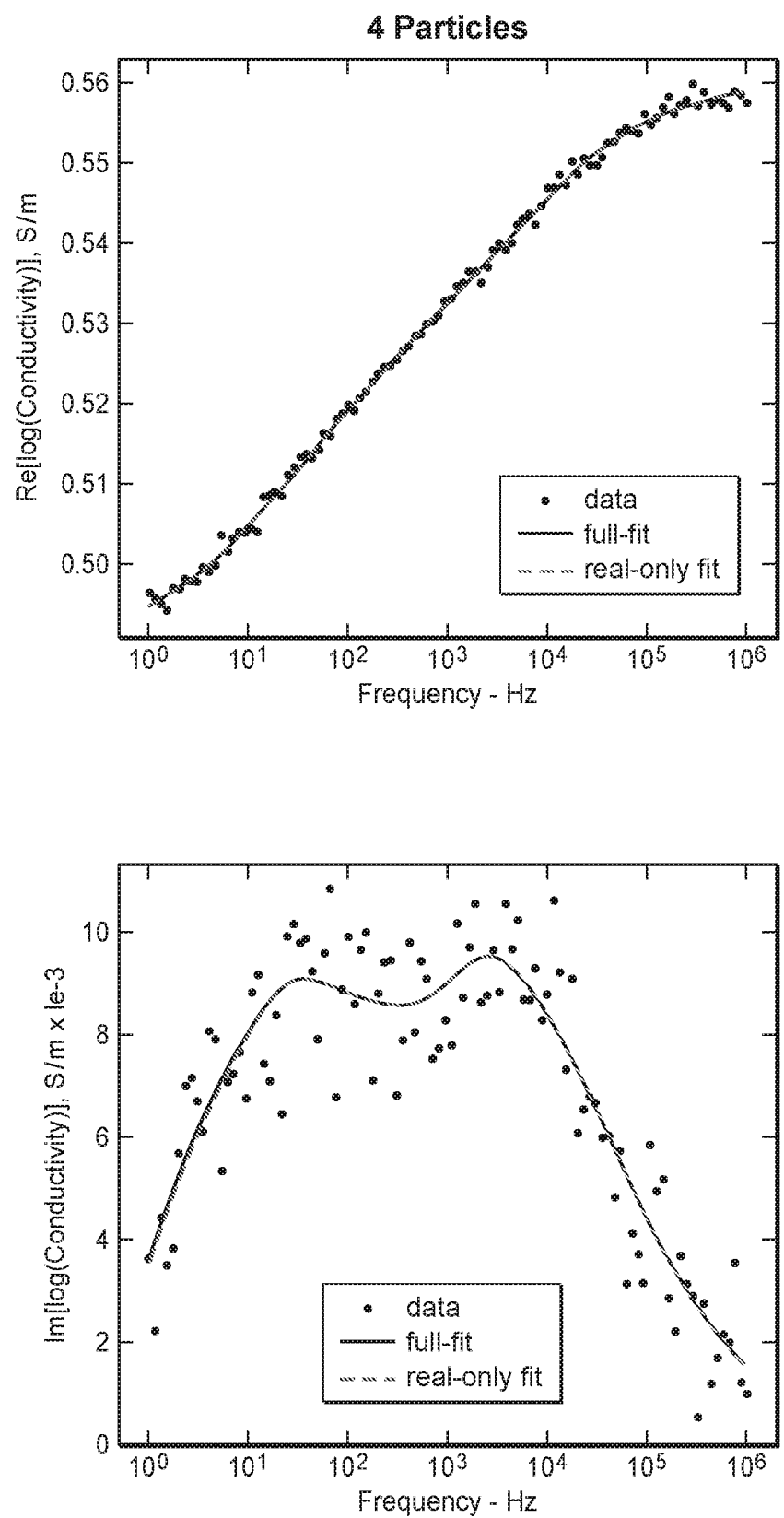
FIG. 9 is a collection of plots illustrating inversion results for the produced tracer materials that include 4 electromagnetically distinct added tracer materials from the example analysis of FIG. 6.
Figure 11:
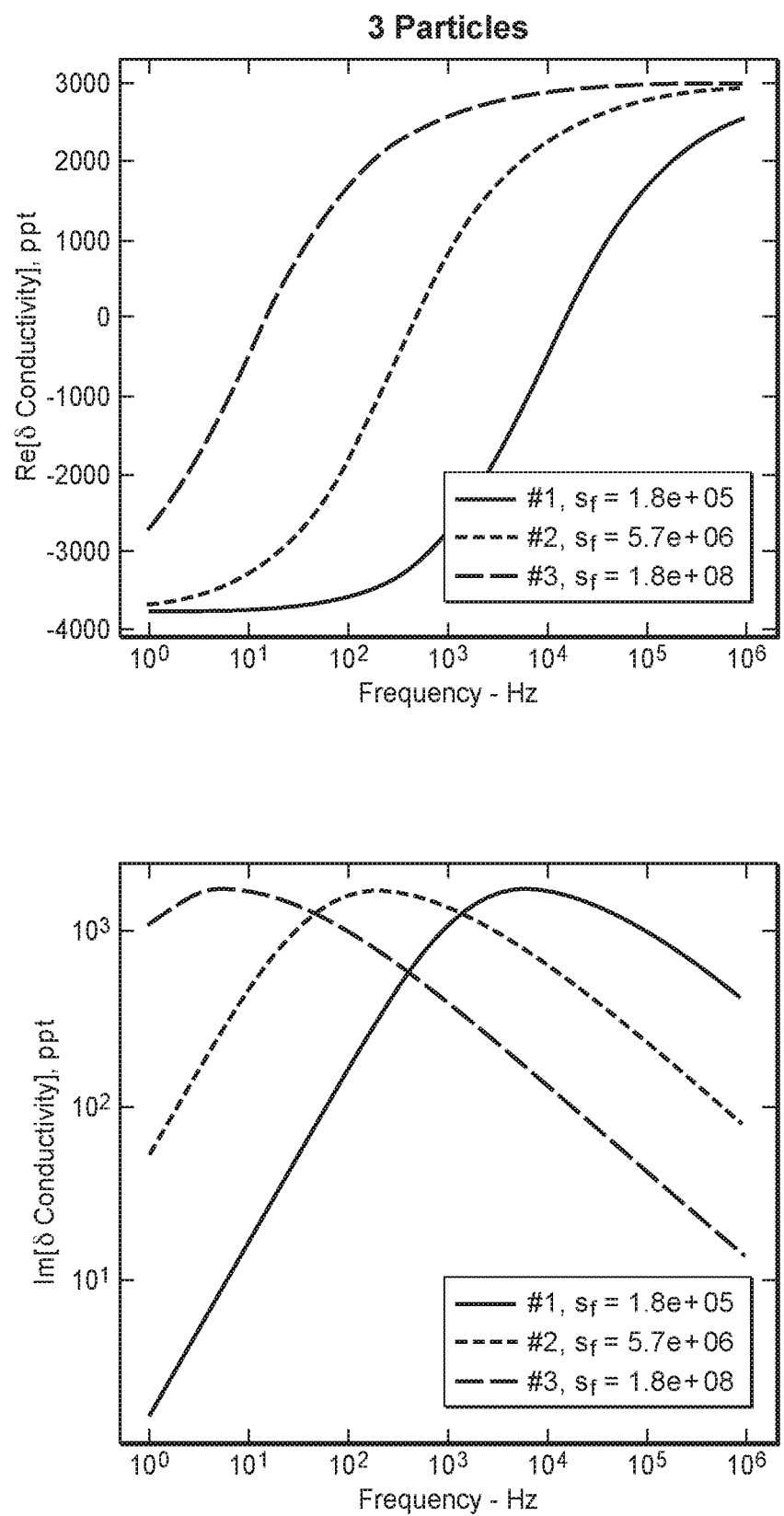
FIG. 11 is a collection of plots illustrating real and imaginary portions of the determined volume fractions for the produced tracer materials that include 3 electromagnetically distinct added tracer materials from the example analysis of FIGS. 6 and 8.
Figure 12:
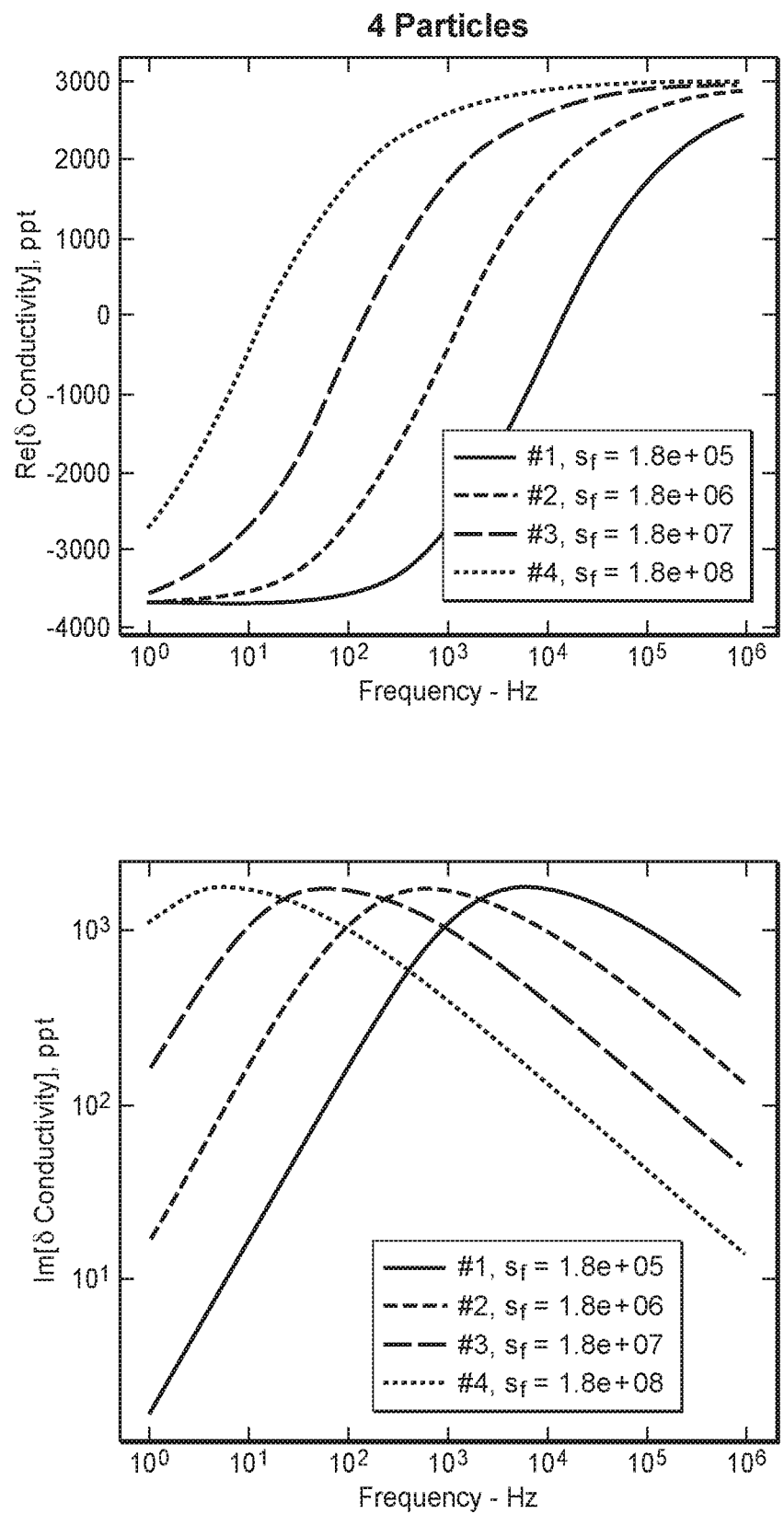
FIG. 12 is a collection of plots illustrating real and imaginary portions of the determined volume fractions for the produced tracer materials that include 4 electromagnetically distinct added tracer materials from the example analysis of FIGS. 6 and 9.

More specifically, FIG. 6 illustrates determined, or calculated, volumetric concentrations of specific produced tracer materials for produced tracer materials that include 2, 3, or 4 electromagnetically distinct added tracer materials. FIGS. 7 and 10 illustrate the raw calculations for 2 electromagnetically distinct particles, FIGS. 8 and 11 illustrate the raw calculations for 3 electromagnetically distinct particles, and FIGS. 9 and 12 illustrate the raw calculations for 4 electromagnetically distinct particles.

In each sub-plot of FIG. 6 (i.e., the first plot, which includes 2 electromagnetically distinct particles, the second plot, which includes 3 electromagnetically distinct particles, and the third plot, which includes four electromagnetically distinct particles), the actual volume fraction of the particle is indicated by the solid bar, the volume fraction as estimated from equation (15) is indicated by the bar with diagonal line fill, the volume fraction as estimated from equation (12) is indicated by the bar with vertical line fill, and the volume fraction as estimated from equation (13) is indicated by the bar with horizontal line fill. As may be seen from FIG. 6, the accuracy of the estimated volume factions, when compared to the actual volume fractions, decreases as the number of particle types increases.

In the present disclosure, several of the illustrative, non-exclusive examples have been discussed and/or presented in the context of flow diagrams, or flow charts, in which the methods are shown and described as a series of blocks, or steps. Unless specifically set forth in the accompanying description, it is within the scope of the present disclosure that the order of the blocks may vary from the illustrated order in the flow diagram, including with two or more of the blocks (or steps) occurring in a different order and/or concurrently. It is also within the scope of the present disclosure that the blocks, or steps, may be implemented as logic, which also may be described as implementing the blocks, or steps, as logics. In some applications, the blocks, or steps, may represent expressions and/or actions to be performed by functionally equivalent circuits or other logic devices. The illustrated blocks may, but are not required to, represent executable instructions that cause a computer, processor, and/or other logic device to respond, to perform an action, to change states, to generate an output or display, and/or to make decisions.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, A, B, and C together, and optionally any of the above in combination with at least one other entity.

In the event that any patents, patent applications, or other references are incorporated by reference herein and (1) define a term in a manner that is inconsistent with and/or (2)

are otherwise inconsistent with, either the non-incorporated portion of the present disclosure or any of the other incorporated references, the non-incorporated portion of the present disclosure shall control, and the term or incorporated disclosure therein shall only control with respect to the reference in which the term is defined and/or the incorporated disclosure was present originally.

As used herein the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/ or methods, are also within the scope of the present disclosure.

INDUSTRIAL APPLICABILITY

The systems and methods disclosed herein are applicable to the oil and gas industries.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions, and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

What is claimed is:

1. A method of monitoring production of fluids from a subterranean formation, the method comprising:
producing a produced stream via a hydrocarbon well that extends within a region of the subterranean formation, wherein the region of the subterranean formation includes formation fluid and an added tracer material, wherein the produced stream includes a produced fluid and a produced tracer material, wherein the produced fluid includes a fraction of the formation fluid, wherein the produced tracer material includes a fraction of the added tracer material, and further wherein the produced tracer material includes a particulate tracer that defines a tracer electrical capacitance that differs from a fluid electrical capacitance of the produced fluid;
electromagnetically exciting the produced tracer material with an input electromagnetic signal that varies through an input frequency range;
responsive to the electromagnetically exciting, generating an output electromagnetic signal, with the produced tracer material, that varies through an output frequency range;
receiving the output electromagnetic signal from the produced tracer material; and
calculating a phase shift as a function of frequency between the input electromagnetic signal and the output electromagnetic signal, and further wherein the identifying includes identifying based, at least in part, on a critical frequency of the phase shift as a function of frequency;
identifying the region of the subterranean formation based, at least in part, on the output electromagnetic signal.

2. The method of claim 1, wherein the hydrocarbon well extends within a plurality of spaced-apart regions of the subterranean formation, wherein each region of the plurality of spaced-apart regions includes a corresponding added tracer material that differs from each other added tracer material in each other region of the plurality of spaced-apart regions, and further wherein the method includes providing an index that correlates each added tracer material to each region of the plurality of spaced-apart regions.

3. The method of claim 2, wherein the identifying includes identifying which region of the plurality of spaced-apart regions produced the produced tracer material based, at least in part, on the index and on the output electromagnetic signal.

4. The method of claim 2, wherein the method further includes at least one of:
(i) estimating solids production from each region of the plurality of spaced-apart regions based, at least in part, on the identifying; and
(ii) estimating formation fluid production from each region of the plurality of spaced-apart regions based, at least in part, on the identifying.

5. The method of claim 2, wherein the method further includes at least one of:
(i) estimating a fraction of the produced tracer material produced from a given region of the plurality of spaced-apart regions based, at least in part, on the identifying; and (ii) estimating a fraction of the produced fluid produced from a given region of the plurality of spaced-apart regions based, at least in part, on the identifying.

6. The method of claim 2, wherein the method further includes positioning the corresponding added tracer material within each region of the plurality of spaced-apart regions.

7. The method of claim 1, wherein the hydrocarbon well is a first hydrocarbon well, wherein a second hydrocarbon well extends within the region of the subterranean formation, wherein the method further includes positioning the added tracer material within the region of the subterranean formation via the second hydrocarbon well, wherein the producing includes producing the produced stream via the first hydrocarbon well, and further wherein the identifying includes identifying the presence of a fracture intersection between the first hydrocarbon well and the second hydrocarbon well, within the region of the subterranean formation, based, at least in part, on at least one of:
(i) the output electromagnetic signal; and
(ii) production of the produced tracer material from the first hydrocarbon well.

8. The method of claim 1, wherein the critical frequency is described by the equation:

$$f_c = \frac{\sigma_w}{\pi C_o} \frac{3}{a^2 s_f}$$

where $f_c$ is the critical frequency of the added tracer material, $\sigma_w$ is an electrical conductivity of the produced fluid, $C_o$ is an electrode-electrolyte capacitance per unit area of the added tracer material, a is an average effective particle radius of the added tracer material, and $s_f$ is a surface area to volume ratio of the added tracer material.

9. The method of claim 1, wherein an electrical conductivity of the added tracer material is greater than an electrical conductivity of the produced fluid.

10. The method of claim 1, wherein the calculating includes calculating a capacitive phase shift between a current density and an electric field of the input electromagnetic signal and a current density and an electric field of the output electromagnetic signal.

11. The method of claim 1, wherein the calculating includes calculating an amplitude modulation between a current density and an electric field of the input electromagnetic signal and a current density and an electric field of the output electromagnetic signal.

12. The method of claim 1, wherein, subsequent to the receiving and prior to the identifying, the method further includes calculating an amplitude shift between the input electromagnetic signal and the output electromagnetic signal, and further wherein the identifying includes identifying based, at least in part, on the amplitude shift between the input electromagnetic signal and the output electromagnetic signal.

13. The method of claim 12, wherein the calculating the amplitude shift includes quantifying the amplitude shift as a function of frequency of the input electromagnetic signal.

14. The method of claim 1, wherein the electromagnetically exciting includes electromagnetically exciting within a production tubular that carries the produced stream, wherein the generating includes generating within the production tubular, and further wherein the receiving includes receiving from the production tubular.

15. The method of claim 1, wherein, responsive to the producing and prior to the electromagnetically exciting, the method further includes collecting a volume of the produced stream within a collection vessel.

16. The method of claim 15, wherein the electromagnetically exciting includes electromagnetically exciting a portion of the produced tracer material that was collected within the collection vessel.

17. The method of claim 16, wherein, prior to the electromagnetically exciting, the method further includes concentrating the produced tracer material within the collection vessel to generate concentrated produced tracer material.

18. The method of claim 15, wherein the method further includes separating the portion of the produced tracer material from the produced fluid.

19. The method of claim 18, wherein, prior to the electromagnetically exciting, the method further includes mixing the portion of the produced tracer material with a measurement fluid to generate a measurement mixture, wherein the measurement fluid has a higher electrical resistivity than the produced fluid, wherein the method includes performing the electromagnetically exciting, the generating, and the receiving while the portion of the produced tracer material defines the measurement mixture, to generate an output electromagnetic signal for the measurement mixture, and further wherein the identifying is based, at least in part, on the output electromagnetic signal for the measurement mixture.

20. The method of claim 19, wherein the measurement fluid is a first measurement fluid, wherein the measurement mixture is a first measurement mixture, wherein the output electromagnetic signal for the measurement mixture is an output electromagnetic signal for the first measurement mixture, and further wherein, the method includes:
(i) separating the portion of the produced tracer material from the first measurement fluid;
(ii) mixing the portion of the produced tracer material with a second measurement fluid, which differs from the first measurement fluid, to generate a second measurement mixture; and
(iii) repeating the electromagnetically exciting, the generating, and the receiving while the portion of the produced tracer material defines the second measurement mixture to generate an output electromagnetic signal for the second measurement mixture, and further wherein the identifying is based, at least in part, on the output electromagnetic signal for the first measurement mixture and on the output electromagnetic signal for the second measurement mixture.

21. A hydrocarbon well, comprising:
a wellbore extending within a plurality of spaced apart regions of a subterranean formation;
a production tubular defining a production conduit and extending at least partially within the wellbore;
an added tracer material positioned within each region the plurality of spaced apart regions of the subterranean formation, wherein each region of the plurality of spaced-apart regions includes a corresponding added tracer material that differs from each other added tracer material in each other region of the plurality of spaced-apart regions;
an electromagnetic transmitter configured to provide an input electromagnetic signal to an electromagnetic exciting region of the production conduit to electromagnetically excite a produced tracer material that forms a portion of a produced stream that flows within the production conduit, wherein the excited produced tracer material includes a portion of the added tracer materials produced from the subterranean formation within the produced stream;

an electromagnetic receiver configured to receive an output electromagnetic signal from an electromagnetic output region of the production conduit, wherein the output electromagnetic signal is generated, by the produced tracer material, responsive to electromagnetic excitation of the produced tracer material by the input electromagnetic signal; and a controller programmed to (i) calculate a phase shift as a function of frequency between the input electromagnetic signal and the output electromagnetic signal, and (ii) identify which region of the plurality of spaced-apart regions produced each of the produced tracer materials based, at least in part, on a critical frequency of the phase shift as the function of frequency and a tabulation that correlates each critical frequency of each added tracer material to each region of the plurality of spaced-apart regions.

22. The hydrocarbon well of claim 21, wherein the controller further is programmed to:

(i) calculate an amplitude shift between the input electromagnetic signal and the output electromagnetic signal; and (ii) identify which region of the plurality of spaced-apart regions produced the produced tracer material based, at least in part, on the amplitude shift and a tabulation that correlates each amplitude shift of each added tracer material to each region of the plurality of spaced-apart regions.

23. The hydrocarbon well of claim 21, wherein the hydrocarbon well is a first hydrocarbon well, wherein a second hydrocarbon well extends within the region of the subterranean formation, and further wherein the controller is programmed to identify the presence of a fracture intersection between the first hydrocarbon well and the second hydrocarbon well, within the region of the subterranean formation, based, at least in part, on at least one of:

(i) the output electromagnetic signal; and (ii) production of the produced tracer material from the second hydrocarbon well.

* * * * *